Oct. 19, 1965    P. A. BEZZERIDES    3,212,585
SOIL MULCHER
Filed Feb. 24, 1964    2 Sheets-Sheet 1
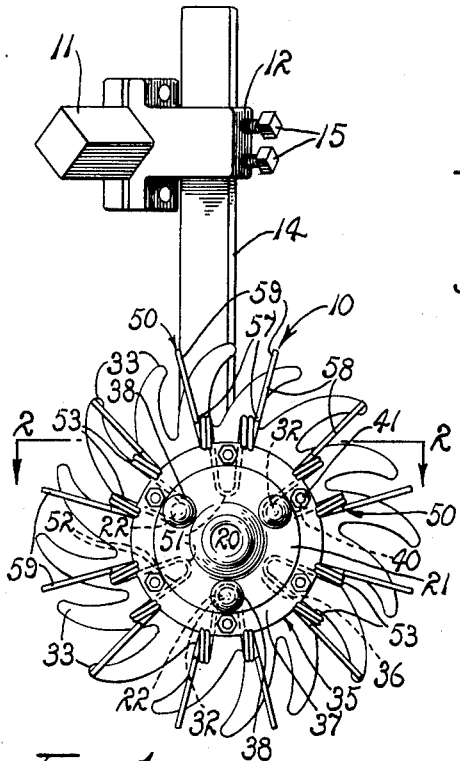
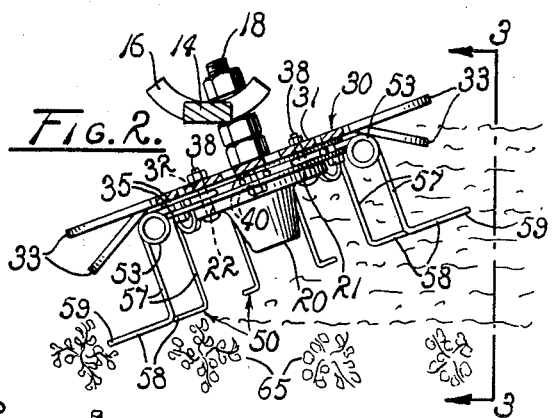
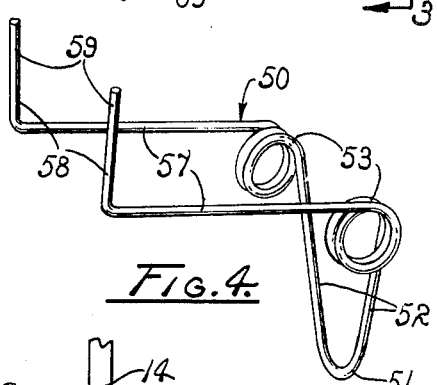
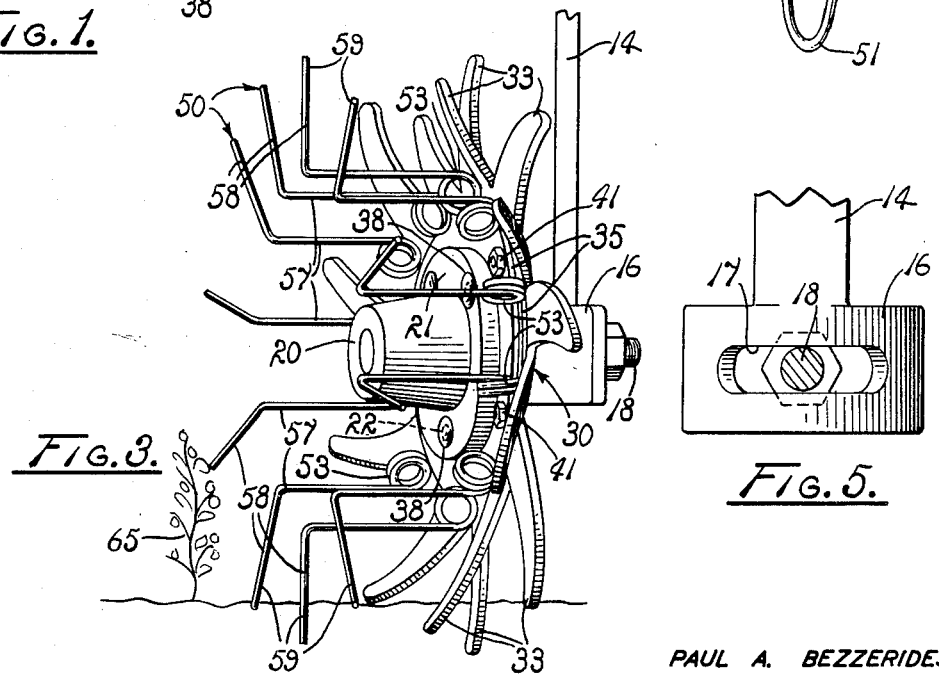
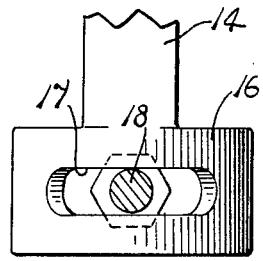
PAUL A. BEZZERIDES
INVENTOR
Huebner & Worrel
ATTORNEYS

United States Patent Office 3,212,585
Patented Oct. 19, 1965

3,212,585
SOIL MULCHER
Paul A. Bezzerides, Orosi, Calif., assignor of one-half to Arthur A. Bezzerides, Orosi, Calif.
Filed Feb. 24, 1964, Ser. No. 346,904
7 Claims. (Cl. 172—142)

The present invention relates to a soil mulcher for earth cultivation in close proximity to crops and the like and more particularly to a rotary mulching wheel having peripheral outwardly extending teeth and a plurality of resilient spring fingers mounted concentrically on a side of said wheel with outer ends extended radially thereof for pulverizing earth penetration.

The soil along rows of plants frequently becomes hard-crusted or clodded which hinders seed germination, absorption of moisture into the soil and makes cultivation difficult, particularly with weeding tools consisting solely of flexible blades and the like which by themselves cannot readily penetrate such hard crust. Conventional sweep-type cultivating tools or French plows are usually employed to break up or remove such hard-crusted soil. Such tools, when drawn along the rows of plants, slide under the crusted surface and have a tendency to pull up and break off slabs of such compacted surface soil which cannot be readily worked by subsequent more refined cultivating and weeding tools. Also, the slabs or clods frequently fall on or crush immature plants. Disk cultivators have also been used to cut through and break up clods along plant rows. However, such disks do not readily conform to hilled rows, pull soil away from the plants, frequently exposing the roots, and must be carefully positioned with respect to the row so as not to damage the plants. Such tools frequently leave a hard ridge adjacent to plant rows which presents an obstruction to subsequent weeder tools, shielding the rows and areas between plants in the rows from subsequent cultivation. The subsequently employed weeder tools are therefore rendered ineffective for removing weeds between the plants.

Attempts to overcome such problems have been made by providing toothed-wheel-type cultivators having a plurality of teeth disposed in planes aligned with the rows of plants. While fully effective in certain operational environments, they have not been fully successful in other environments in that the teeth thereof tend to penetrate the crusted surface and pry out chunks or clods which either remain wedged between the teeth or are discharged by rotation thereof and scattered indiscriminately about the area being cultivated. Also, it has been difficult effectively to conform such toothed wheels to hilled rows of plants without complicated and troublesome mounting linkages.

Therefore, it is an object of the present invention to provide an improved soil mulcher.

Another object is to provide an improved soil mulcher which is effective to maintain the soil in good working condition for subsequent cultivating and weeding operations.

Another object is to provide an improved soil mulcher which is capable of supplementing the mulching operation by effectuating a weeding action simultaneously therewith.

Another object is to provide an improved soil mulcher having a substantially rigid rotary earth engagement wheel and a plurality of spring fingers mounted on a side thereof which inter-act to pulverize the soil closely adjacent to the wheel.

Another object is to provide an improved soil mulcher including a substantially rigid rotary earth engagement wheel having a plurality of peripheral teeth which includes a plurality of spring fingers mounted on a side thereof, which teeth and fingers can inter-act to pulverize the soil closely adjacent to plants without damaging the same.

Another object is to provide such a soil mulcher which is adapted for oblique angular positioning relative to the rows of plants.

Another object is to provide such a soil mulcher wherein the spring fingers resiliently penetrate the soil while substantially maintaining their original alignment on the wheel.

Another object is to provide such a soil mulcher wherein the spring fingers may be readily removed from the wheel for repair and for replacement purposes.

Other objects and advantages of the present invention will subsequently become more clearly apparent upon reference to the following description.

In the drawings:

FIG. 1 is a side elevation of the soil mulcher of the present invention.

FIG. 2 is a top section through the soil mulcher of FIG. 1 taken on line 2—2 of FIG. 1 and showing the mounting portions of auxiliary spring finger elements with the mulcher disposed in one operating position adjacent to a row of plants.

FIG. 3 is a perspective of the soil mulcher of the preceding figures viewed from line 3—3 of FIG. 2.

FIG. 4 is a somewhat enlarged perspective of an individual auxiliary mulching element of the soil mulcher of the preceding figures dismounted from the soil mulcher for illustrative convenience.

FIG. 5 is a somewhat enlarged fragmentary side elevation of a rotatably adjustable mounting means for the soil mulcher of FIGS. 1–3.

Figure 6:
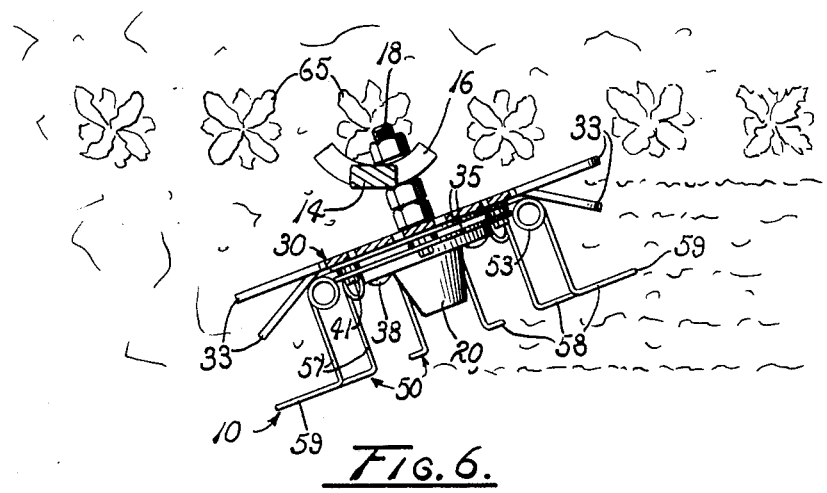
FIG. 6 is a top plan view of the soil mulcher of FIG. 2 but shown in a further operating position.

Referring more particularly to the drawings, the soil mulcher of the present invention is shown generally at 10 and is adapted to be mounted on a conventional tool bar fragmentarily shown at 11 borne on an earth traversing vehicle such as a tractor, row crop sled, or the like, not shown. A plurality of mounting brackets, one of which is shown at 12, are carried on the tool bar for individually mounting a plurality of the soil mulchers 10 although only one such mulcher and mounting is shown and described herein.

A tool post 14 is adjustably rigidly mounted on the bracket 12 in depending relation from the tool bar 11 by bolts 15 extended through the bracket. The tool post provides a lower horizontally transversely arcuate end 16 having an elongated aperture 17 through which is rotatably adjustably disposed an elongated axle bolt 18. A hub 20 is freely rotatably mounted on the axle bolt 18 for rotation about a substantially horizontal axis. The hub includes an annular flange 21 through which is formed a plurality of circular bolt-receiving apertures or bores 22.

A substantially rigid toothed rotary mulching wheel 30 having a central mounting portion 31 is disposed in concentric circumscribing relation on the axle bolt 18. The central mounting portion of the mulching wheel includes apertures 32 aligned with the apertures 22 in the flange of the hub. The wheel has peripheral teeth 33 extended arcuately outwardly in a common direction circumferentially of the wheel.

Identical opposite clamping disks 35 having central clamping portions 36 and peripheral clamping portions 37 are disposed in clamped relation between the hub 20 and the wheel 30 with their oppositely facing central portions in superimposed facing engagement against the flange 21 of the hub and the central portion 31 of the wheel respectively in concentric circumscribing relation to the axle bolt 18. Each of the central clamping portions of the disks includes suitable apertures aligned with the apertures 22 of the hub flange and the apertures 32 of the mulching wheel. Through said apertures a plurality of carriage bolt and nut assemblies 38 are disposed to hold the mulching wheels and the clamping disks on the hub 20 for rotation therewith about the axis of the axle bolt 18. Each of the peripheral clamping portions 37 of the disks includes a plurality of apertures 40 concentrically disposed around the periphery of the disk in equally circumferentially spaced relation. The respective carriage bolt and nut assemblies 38 are radially aligned with the proximately adjacent apertures 40. Each aperture 40 is axially aligned with the corresponding aperture in the opposite disk. A clamping bolt and nut assembly 41 is disposed through each aligned pair of apertures 40.

A plurality of resiliently flexible auxiliary spring finger cultivating elements 50, as shown in FIG. 4, are mounted on a side of the mulching wheel 30. The finger elements are formed from spring steel or the like. Each spring finger element includes a planar substantially U-shaped central mounting portion 51 having opposite legs 52 each of said legs extending continuously through a coil spring 53 into an arm 57 perpendicular to the plane of the mounting portion 51 and a prong 58 extended perpendicularly from the arm 57 substantially parallel to its corresponding leg 52 having an extended outer end 59. The finger elements are mounted with their U-shaped mounting portions clamped between the clamping disks, as in FIG. 1, in fixed interplanar engagement therebetween. The legs of each mounting portion are disposed in bisected relation astraddle one of the clamping bolts 41 as well as the corresponding carriage bolt 38 if said carriage bolt is proximately radially adjacent to said clamping bolt. The springs 53 are disposed adjacently of the peripheral edge of the disks and the arms 57 project perpendicularly of the mounting portion 31 of the wheel. The prongs 58 extend radially outwardly of the wheel 30 having outer ends 59 disposed in a plane circle configuration substantially parallel to the wheel having substantially the same diameter as the wheel.

*Operation*

The operation of the described embodiment of the subject invention is believed to be clearly apparent and is briefly summarized at this point. The soil mulcher may be disposed in an operating position similar to that shown in FIGS. 2 and 3 by manipulation of the mounting bracket 12 and by rotatably adjusting the position of the axle bolt 18 in its arcuate aperture 18 thus giving the soil mulcher an obliquely angular orientation with the row of plants 65. Any angular position desired can be attained provided it is sufficient to allow effective rolling earth engagement by the mulching wheel 30. With forward movement of the mulching wheel longitudinally along such a row of plants and with the teeth 33 and spring-mounted fingers 50 in earth engagement, the wheel is rotated in a counterclockwise direction, as viewed in FIG. 1, or in a tangential direction opposite to the direction of arcuate curving of the teeth.

As the wheel 30 continues to rotate and is moved longitudinally of the row 65 the resilient fingers 50 move substantially transversely outwardly from the plants effectively to co-act with the soil-slicing dislodging action of the arcuate teeth 33 so as to pulverize the soil closely adjacent to the plants as well as effectively to weed the soil. The circumferential spacing and inherent flexibility of the fingers tend to minimize damage to the plants during the mulching process. As the wheel 30 continues to rotate, the outer end portions 59 of the prongs 58 have a piercing-stirring effect while churning rapidly through the soil, without scattering extraneous clods or debris about the area being cultivated. During normal operation the resilient spring-mounted fingers 50 serve appreciably to increase the mulching effect of the arcuate teeth 33 on the soil, yet leave the soil substantially in the same position as before mulching.

In addition to the above described operating position, the soil mulcher 10 may be disposed in a position similar to that shown in FIG. 6, with the finger elements 50 directed away from the row of plants 65. In this position, the finger elements effectively churn the soil lying between the rows of plants, leaving it well mulched. The choice of position for the finger elements depends principally on the configuration of the transverse soil profile across the rows of plants as well as on the results desired. Disposing the soil mulcher with its resilient fingers adjacent to the plants, allows mulching and weeding more closely to the plants without damage thereto. Disposing the soil mulcher with its resilient fingers away from plants allows more effective mulching of the sides of the ridges.

Figure 7:
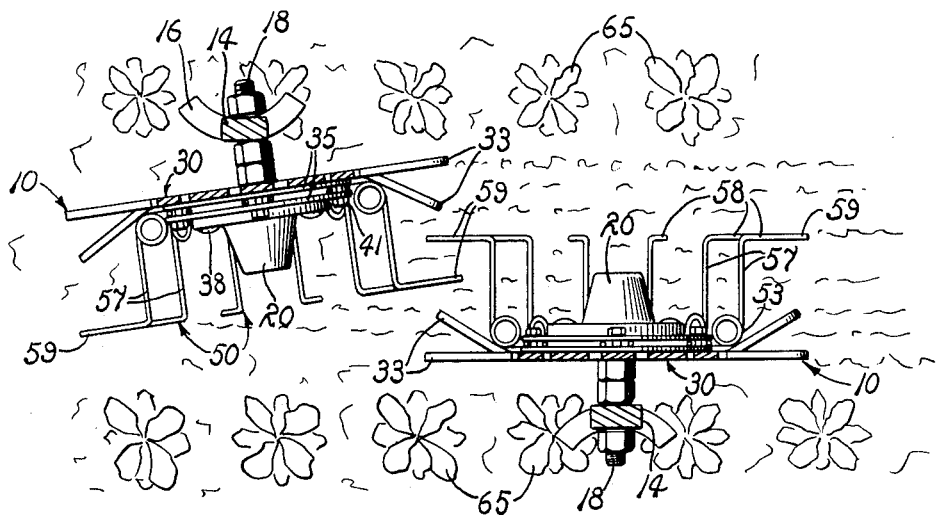
FIG. 7 is a top plan view of two of the soil mulchers of FIGS. 1–3 shown in the operating position of FIG. 6 in overlapping echelon arrangement.

Although only one soil mulcher 10 is adjacent to one side of the row of plants 65, it is readily apparent that several pairs or sets of pairs of the soil mulchers can be mounted on opposite sides of several adjacent rows for simultaneous operation. Several soil mulchers may also be mounted in overlapping echelon arrangement, as in FIG. 7, on each side of the row with the successively outwardly spaced soil mulchers being progressively downwardly spaced in conforming soil engagement along the sloping sides of a row.

In view of the foregoing, it is readily apparent that the structure of the present invention has provided an improved soil mulcher for substantially completely pulverizing the soil closely adjacent to rows of plants so that such soil can more readily absorb moisture and be maintained in better condition for working by subsequent weeder tools and the like. The churning resilient fingers inter-act with the slicing rigid teeth so as to cause an appreciably more thorough mulching effect substantially pulverizing and stirring the soil and leaving it substantially in place. Also, the flexible prong-like fingers acting in conjunction with the more rigid wheel produce a breaking-up effect not possible with mulching wheels having only a single row of rigid teeth, which sometimes lift the soil in large unworkable clods with incident damaging effect on adjacent plants. Also, the mulchers of the present invention need not be precisely positioned with respect to rows of plants and can operate effectively much closer to plants than conventional tools because of the axially spaced resilient spring fingers which do not as extensively damage or remove plants as do solid disk blades when the mulchers veer inwardly of the rows of plants. Also, the soil mulcher having resiliently flexible spring fingers attached is capable of effectively weeding, thinning and mulching in a single operation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A soil mulcher for cultivating closely adjacent to a row of plants comprising a substantially rigid rotary mulching wheel having outwardly extended peripheral teeth mounted for rolling earth engagement; means mounting said wheel for earth traversing movement in a predetermined forward direction of travel longitudinally of such row of plants in adjustable obliquely angular orientation with said forward direction of travel; rotatably adjustable means for angularly positioning the mulching wheel with respect to the row of plants; a plurality of resiliently flexible spring fingers mounted in integral pairs on a side of said wheel in concentrically circumscribing relation to said wheel's axis of rotation disposed in substantially equally circumferentially spaced relation, said fingers including resilient spring arms extended axially of said wheel and thence directed radially outwardly of the axis of said wheel and having outer ends extended for pulverizing earth penetration adjacently coextensive with the earth engagement of said wheel, the outer end of said fingers being substantially equally spaced and disposed in a common plane in substantially parallel relation to said wheel at a lateral distance therefrom such as to allow pulverizing interaction between said earth engaging teeth and said fingers in all angular operating positions of said mulching wheel; and means mounting the pairs of fingers on the wheel.

2. A soil mulcher comprising a rigid toothed wheel, means mounting the wheel for rolling earth traversing movement oblique to the direction of said movement, and a plurality of pairs of resilient cultivating elements mounted on the wheel in an arrangement concentrically thereof, each of said elements consisting of a continuous length of spring wire material having a central portion providing opposite legs and mounted on the wheel, coil spring sections individually continuous with the opposite legs of the central portion disposed about a common axis substantially parallel to the wheel, arms individually continuous with the coil spring sections extended axially of the wheel, and prongs individually continuous with the arms extended radially of the wheel in substantially parallel spaced relation thereto.

3. A soil mulcher for cultivating closely adjacent to a row of plants comprising a wheel having peripheral teeth extended arcuately outwardly in a common direction circumferentially of the wheel; means mounting said wheel for earth traversing movement in a predetermined forward direction of travel longitudinally of such row of plants in adjustable obliquely angular orientation with said forward direction of travel; rotatably adjustable means for angularly positioning the mulching wheel with respect to the row of plants; a plurality of auxiliary elements each consisting of a length of flexible resilient wire having a planar substantially U-shaped central mounting portion having opposite legs, each leg extending through an integral coil at the end thereof continuously into an arm disposed normal to the plane of said mounting portion, and prongs extending individually continuously from the respective arms substantially parallel to the corresponding legs of the mounting portion; and means mounting the auxiliary elements on the wheel with the mounting portions flat against a common side of the wheel with the arms projected axially of the wheel substantially concentrically thereof in substantially equally circumferentially spaced relation and the prongs extended radially outwardly of the wheel in spaced relation thereto having extended ends disposed in a plane circle substantially parallel to said wheel having substantially the same diameter as the wheel.

4. A soil mulcher for cultivating closely adjacent to a row of plants comprising a wheel having peripheral teeth extended arcuately outwardly in a common direction circumferentially of the wheel; means mounting the wheel for rolling earth engagement with the wheel rotating in a direction opposite to the direction of arcuate extension of the teeth circumferentially thereof; rotatably adjustable means for angularly positioning the mulching wheel with respect to the row of plants; a plurality of auxiliary elements each consisting of a length of flexible resilient wire having a planar substantially U-shaped central mounting portion having opposite legs, each leg of said U-shaped mounting portion extending through an integral coil at the end thereof continuously into an arm disposed normal to the plane of said mounting portion and prongs extending individually continuously from the respective arms substantially parallel to the corresponding legs of the mounting portion, said auxiliary elements being mounted on the wheel in an arrangement substantially concentric to the wheel having the extended ends of said prongs disposed in a plane circle substantially parallel to the wheel having substantially the same diameter as said wheel; and a pair of opposite clamping disks mounted on a common side of said wheel for clamping said pairs of fingers releasably therebetween and mounting said fingers on the wheel with the mounting portions flat against a common side of the wheel the arms projected axially of the wheel substantially concentrically thereof in substantially equally circumferentially spaced relation.

5. A soil mulcher comprising a substantially rigid wheel having a toothed periphery; means mounting the wheel for rolling earth traversing movement disposed in a substantially erect plane oblique to the direction of said movement; a plurality of resilient elements providing prongs adapted to penetrate the earth in earth pulverizing engagement; and resilient means mounting said elements on the wheel with the prongs disposed in axially offset relation to the wheel and to the toothed periphery thereof and in substantially radially extended relation to the axis of the wheel for earth pulverizing engagement adjacent to said toothed periphery.

6. A soil mulcher comprising a substantially rigid toothed wheel, means mounting the wheel for rolling earth traversing movement obliquely to the direction of said movement; a plurality of resilient cultivating elements, each of said elements having a mounting portion and a prong connected to the mounting portion; and spring means mounting said mounting portion on the wheel with the prongs extended radially of the wheel in axially spaced relation to the wheel and to the toothed periphery and in substantially parallel relation to the wheel, said prongs being disposed for pulverizing earth engagement adjacent to said toothed periphery.

7. A mulcher comprising a substantially rigid wheel having teeth outwardly extended from the periphery thereof and having a predetermined axis of rotation; and resilient cultivating elements mounted on the wheel, said elements having arms extended in substantially parallel relation axially of the wheel in substantially equally spaced relation from said axis and inwardly of the teeth, and prongs individual to the arms and continuous with the extended ends thereof extended outwardly of the axis, said prongs being disposed in a substantially common plane normal to said axis.

References Cited by the Examiner
UNITED STATES PATENTS

| | | | |
|---|---|---|---|
| 788,013 | 4/05 | Arnold | 172—555 |
| 2,223,035 | 11/40 | Haas et al. | 172—55 X |
| 3,082,829 | 3/63 | Buddingh et al. | 172—142 X |

ABRAHAM G. STONE, *Primary Examiner.*

T. GRAHAM CRAVER, *Examiner.*